May 6, 1969     HIDEO MORI     3,443,072
OBJECT IDENTIFICATION SYSTEMS
Filed Dec. 10, 1964
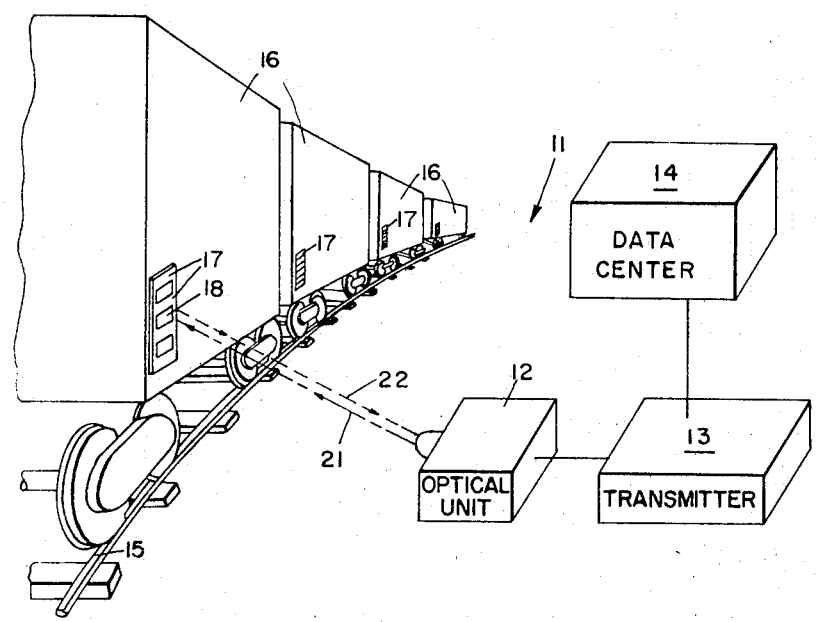
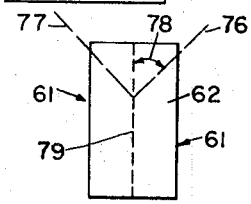
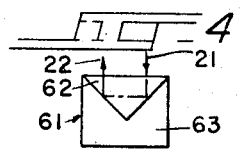
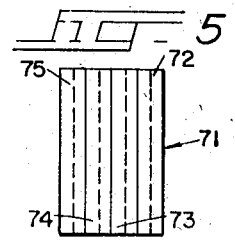
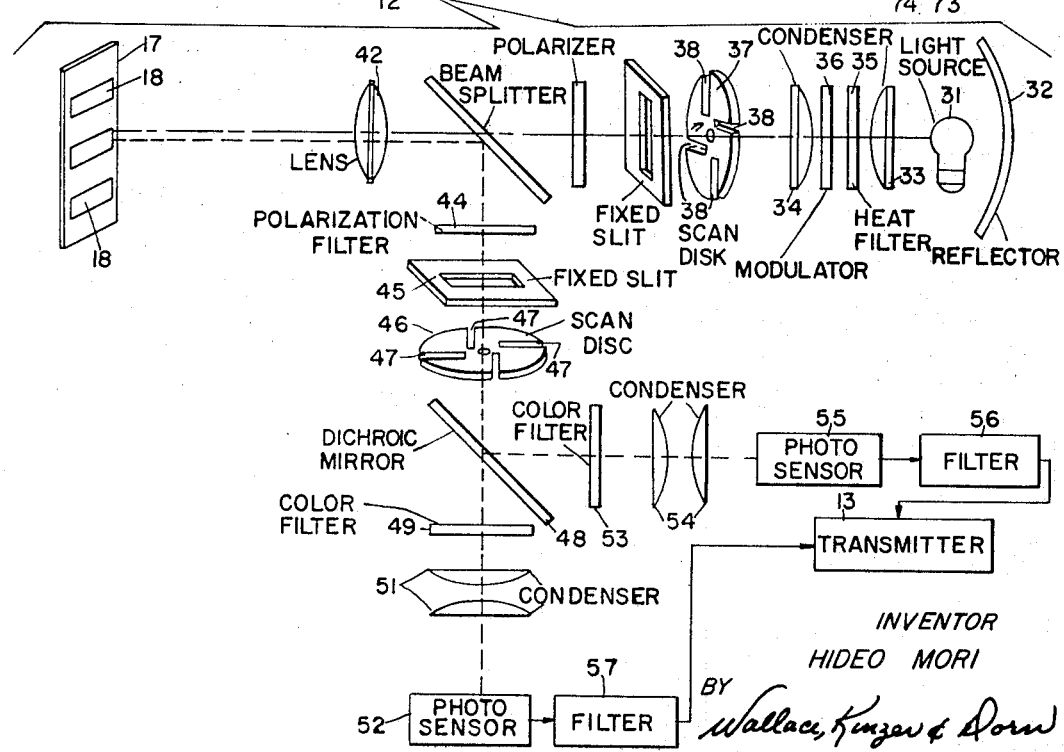
INVENTOR
HIDEO MORI

United States Patent Office 3,443,072
Patented May 6, 1969

3,443,072
OBJECT IDENTIFICATION SYSTEMS
Hideo Mori, Woodland Hills, Calif., assignor to Abex Corporation, a corporation of Delaware
Filed Dec. 10, 1964, Ser. No. 417,362
Int. Cl. G06c *15/00;* G06m *7/00*
U.S. Cl. 235—61.11                    7 Claims

ABSTRACT OF THE DISCLOSURE

An optical automatic object-identification system comprising means for developing a light beam of uniform initial polarization and for projecting that beam toward a predetermined point traversed by each object to be identified. Each object carries a code reflector member having a plurality of individual reflector elements each of which reflects the light beam with a polarization change of 90°. A photosensitive detector intercepts the reflected light beam, polarization filter means being employed to limit the light reaching the detector to light which has been rotated 90° from the initial polarization.

---

This invention relates to a new and improved system for identifying objects of various kinds without making physical contact with the objects as the objects are moved along a given course. In particular, the invention relates to a new and improved system for identifying railroad cars and locomotives.

It is critically important for railroad management to know, at all times, the locations of the cars and locomotives present in a railroad system. Identification of a loaded car and its current location enables the railroad to keep the shipper and receiver posted as to progress of the car. With respect to an empty car, information as to its location is essential to enable prompt and efficient use of the car when needed. Moreover, both locomotives and cars require periodic servicing, and continuing availability of information regarding their locations is of substantial value in this regard.

A number of different systems have been proposed for automatic identification and reporting of the location of railroad cars and locomotives. One advantageous system is described in detail in the co-pending application of Omer F. Hamann and Sherman H. Boyd, Ser. No. 319,914, filed Oct. 4, 1963, in which each railroad car and locomotive is provided with coded microwave reflector that serves as an identification member. That system includes a roadside scanning station that radiates a microwave signal, the microwave signal being reflected back from the coded identification members on the cars and locomotives as the latter traverse the scanning station. The reflected signal is picked up by a receiving antenna and is detected and processed to identify the individual railway vehicles passing through the scanning station.

Other proposals for automatic car identification have entailed the use of optical scanning systems. In the proposed optical systems, individual cars are encoded by panels of retro-reflective material arranged in accordance with a predetermined code. These panels are illuminated as the cars pass a given scanning station on the track, and the reflected light from the panels is intercepted and de-coded to develop electrical signals representative of the car identification. Code distinctions for systems of this general kind have been based upon relative positions of reflective and non-reflective elements in the code panels and also upon the color of the light reflected from different parts of the panels. Where color is a distinguishing factor, retro-reflective materials of different color absorption properties have been utilized, usually in conjunction with a "white" light source.

Optical systems for railroad car identification and like applications, as previously known, have been subject to substantial disadvantages when operated under adverse weather conditions, due to masking of the reflective code elements by rain, snow, and the like and by dirt, grease, and other foreign material deposited upon the code panels changing the reflection efficiencies of the panels to a substantial extent. Moreover, the optical systems proposed in the past have experienced appreciable difficulties in distinguishing light reflected by the code panels and from light reflected by other parts of the railroad cars and from other extraneous light that may originate with the light source of the system or may originate from ambient sources such as the sun. These problems and difficulties are overcome, to a substantial extent, by the microwave system set forth in the aforementioned application of Hamann and Boyd. The microwave system, however, requires a relatively expensive signal source. Moreover, the specialized microwave lens apparatus and other equipment is relatively complex and expensive in construction as compared with ordinary optical apparatus.

It is a principal object of the present invention, therefore, to afford a new and improved, inexpensive optical system for automatic identification of railroad cars and other objects that is effectively operable under adverse environmental conditions and hence minimizes or eliminates the problems and difficulties attendant upon previously known systems.

A particular object of the invention is to provide a new and improved optical system for automatic identification of railroad cars and like objects that provides a high level of rejection for extraneous reflected light signals from the objects being identified and from other sources, yet requires only simple and inexpensive reflector elements for code identification of those objects. One particular feature of the present invention pertaining to noise rejection is the use of polarization rotation techniques, in the optical system, to minimize or eliminate the effects of stray reflections of light, whether originating from the light source of the identification system or from other sources. Another feature of the invention pertaining to effective noise rejection is the utilization of a modulated or "chopped" light beam, with appropriate frequency-sensitive electrical detection apparatus that is responsive only to the operating frequency of the modulator or chopper of the system.

An additional object of the invention is to afford a fully collinear optical apparatus for a reflected-light object-identification system, enabling the system to attain adequate resolution with maximum depth of field.

Another particular object of the invention is to provide a new and improved target element for an automatic optical car identification system, permitting the use of optical techniques in environments that may cause the deposit of substantial quantities of foreign materials on the target members.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a partially schematic perspective view of a trackside scanning station for an automatic vehicle identification system constructed in accordance with the present invention;

FIG. 2 is a schematic exploded view of optical scanning and receiving apparatus for the scanning station of FIG. 1, constructed in accordance with a particular embodiment of the invention;

FIG. 3 is a front elevation view of one form of reflector element that may be utilized in a code reflector member or target employed in the system of FIG. 1;

FIG. 4 is an end view of the reflector element of FIG. 3;

FIG. 5 is a front elevation view of another form of reflector element that may be used in the reflector members in the system of FIG. 1; and FIG. 6 is an end elevation view of the reflector element of FIG. 5.

FIG. 1 illustrates an automatic railway car identifying system 11 constructed in accordance with the present invention. System 11 constitutes a trackside scanning and identification station and may be a part of a system that includes a plurality of essentially similar stations. The system includes an optical unit 12 described in detail hereinafter in connection with FIG. 2. Optical unit 12 includes one or more photosensitive detecting devices that develop electrical code signals; the optical unit is electrically coupled to a transmitter 13 that is in turn coupled to a data center 14. Data center 14 may also be connected to a plurality of additional systems similar to system 11 to collect and correlate information regarding the cars present at a variety of different points in a complete railroad system.

Optical unit 12 is located immediately adjacent a railroad track 15. Each of the cars or other railway vehicles 16 of the railroad system comprising track 15 carries a code reflector member or target 17. The individual code reflector members 17 each include a plurality of individual reflector elements disposed at predetermined code positions along the length of the target structure.

Optical unit 12, as described in detail hereinafter in connection with FIG. 2, includes scanning means for developing a beam of light having a uniform initial polarization, this initial beam being projected along a given path toward track 15 as indicated by phantom line 21. Code reflector members 17, sometimes referred to herein as target members, are mounted upon the individual railroad cars 16 in position to intercept and reflect the light beam back toward the optical unit along approximately the same path, as generally indicated by dash line 22. Thus, as each reflector member 17 traverses the point upon the course of the railroad cars that intersects the beam path, each of the individual reflector elements 18 momentarily reflects the light beam back to optical unit 12.

Optical unit 12 further includes receiving apparatus for developing electrical code signals in response to the reflected beam 22. This receiving apparatus includes appropriate photosensitive detecting means and suitable apparatus for directing the reflected beam to impinge upon the detecting device or devices. The electrical signals developed in optical unit 12 are transmitted by transmitter 13 to data center 14, which may include an appropriate data storage apparatus and print-out means for affording a record of the location of individually identified cars.

As thus far described, optical system 11 is not substantially different from optical systems previously proposed for freight car identification and other similar applications. Optical unit 12, however, is substantially different from previously proposed optical apparatus for systems of this general kind, and affords unique advantages with respect to elimination of stray reflections and other difficulties presented in optical identification apparatus. Moreover, the individual reflector elements 18 of the reflector members 17 are also substantially different from those utilized in earlier systems.

FIG. 2 illustrates one form of optical apparatus that may be utilized in optical unit 12. In the illustrated construction, optical unit 12 comprises a light source 31 backed by a suitable reflector 32. Light from source 31 is directed along the initial beam path 21 by a suitable condensing and collinating lens system generally indicated by the condenser lenses 33 and 34. A heat filter 35 may be interposed between condenser lenses 33 and 34. Moreover, a conventional light chopper or modulator 36 is preferably incorporated in this portion of the optical system. Modulator 36 may constitute a continuously operated shutter mechanism, functioning at relatively high speed, for intermittently obscuring and clearing beam path 21. Other suitable light modulator apparatus capable of modulating the beam at a given frequency may be utilized as desired; with an appropriate light source, modulation may also be achieved by switching the power supply on and off.

A scanning disc 37 is located along beam path 21 immediately following the condenser lens system. Disc 37 is provided with a plurality of radial slots 38. The scanning disc is continuously rotated at a fixed speed and serves to limit the height of the beam traversing path 21 and to move the beam cyclically upwardly or downwardly, scanning a fixed slit 39 located immediately behind the scanning disc along the beam path.

From fixed slit 39, the beam path extends through a polarizer 40 and a beam splitter 41. Beam splitter 41 may constitute a conventional half-silvered mirror that transmits light therethrough in one direction but that reflects light impinging upon the mirror from the opposite direction. The system further includes a final lens 42 which may be of complex construction but is illustrated as a simple lens element.

The portion of optical unit 12 described thus far in connection with FIG. 2 constitutes a scanning means for developing a beam of light that is projected along beam path 21 toward the target, reflector member 17. The light beam is continuously modulated at a fixed frequency by modulator 36. It is periodically and cyclically moved up or down by means of scanning disc 37 and fixed slit 39, the latter serving to limit the width of the beam. Moreover, the projected beam is limited to a given initial polarization by means of polarizer 40. The beam passes through beam splitter 41 and lens 42 and impinges upon target 17.

The light beam is reflected by target 17 back through lens 42 and impinges upon beam splitter 41. The reflected beam, however, does not pass through the beam splitter but instead is reflected toward receiving means incorporated in optical unit 12. The initial element of the receiving means is a polarizer filter 44 that is utilized to limit light supplied to the receiving means to a given polarization, a polarization that is different from the initial polarization by 90°, as explained more fully hereinafter. From polarization filter 44, the reflected beam passes through a fixed slit 45 and through a second scanning disc 46 along a series of radial slots 47. Scanning discs 37 and 46 are provided with a common drive and are rotated in synchronism with each other.

The next element in the receiving means of the optical system is a dichloric mirror 48 that transmits light of a given color and reflects light of at least one other color. That portion of the reflected beam that passes through dichloric mirror 48 is transmitted through a color filter 49 and an appropriate condenser lens 51 to a first photosensitive detecting device 52. The light reflected by mirror 48 passes through a color filter 53 and then through a condenser 54 to a second photosensitive detecting device 55. Devices 52 and 55 may comprise conventional photocells.

The first photosensitive detecting device 52 develops electrical code signals in response to the light impinging thereon. These electrical signals are applied to a filter 56 that is utilized to reject any signals that do not have a fundamental frequency corresponding to the operating frequency of light modulator 36 in the scanning beam generating portion of the optical system. The electrical signals developed by photocell 55 are applied to a similar filter circuit 57 and both sets of code signals are coupled to transmitter 13.

Before taking up the operation of optical system 12 in detail, it is desirable to consider the construction of the reflector elements 18 of the reflector target 17 and the effect of those reflector elements on the impinging light beam. FIGS. 3 and 4 illustrate one form of reflector element that may be utilized, comprising a corner reflector of substantial size. The corner reflector element 61 comprises a face element 62 of planar configuration on one side, the reverse side of the element 62 comprising two intersecting planar surfaces. Element 62 is backed by a second part 63 of the reflector element. Part 62 should have an index of refraction substantially greater than part 63. For example, part 62 may be formed of a suitable plastic, such as the acrylic plastics available under the trade name "Lucite," whereas part 63 may simply be a confined space delineating an appropriate volume of air.

A light beam impinging upon reflector element 61 along the path 21 is reflected as indicated by lines 21 and 22 in FIG. 4. The reflected light follows path 22, parallel to the impinging path 21, with little or no scattering. Moreover, and of prime importance, polarization of the impinging light is rotated through an angle twice that of the apexial axes of the corner reflector and the incident light polarization. Thus, if the angle 78 (FIG. 4) between the polarization axis 76 of the incident beam and the apexial axis 79 of the reflector is 45°, the reflected light is rotated in polarization through an angle of 90° to axis 77. This is the preferred condition for corner reflector elements employed in the present system, although somewhat smaller or greater polarization shifts may be utilized if desired.

The surface area of reflector element 61 should be made relatively large in comparison with extraneous material such as dust, lint, and grease particles that may collect on the surface of the reflector. If this is done, then the reflector element will continue to act as a corner reflector and will be effective to rotate polarization of the incident light beam even in the presence of substantial quantities of extraneous material. A plurality of these reflector elements are mounted on each of the targets 17 (FIGS. 1 and 2) with the long dimensions of the individual reflector elements at right angles to the scanning direction of the incident beam. Moreover, the individual reflector elements on each target are separated by distances sufficient to allow a separate and distinct reflection to be sensed by the receiving apparatus of optical system 12 for each reflector element on the target.

The individual reflector elements can also be coated with an appropriate material or otherwise pigmented so that only a single color is reflected and rotated and incident light of all other colors is absorbed. This permits a distinction between individual reflector elements based upon the color of the reflected light as well as on the physical spacing of the elements and makes it possible to obtain a substantial increase in the amount of code data encompassed in a target 17 of given size.

In many instances, it is preferable to provide individual reflector elements comprising a plurality of separate corner reflectors instead of the single corner reflector structure illustrated in FIGS. 3 and 4. FIGS. 5 and 6 show a modified construction for the reflector element. The reflector element 71 illustrated therein comprises a plurality of individual corner reflectors 72, 73, 74 and 75 that may be fabricated by molding of a single piece of acrylic or other plastic. It will be recognized that the reflector element 71 is essentially similar in construction to the reflectors employed for warning purposes on automobiles, bicycles, and in many similar applications, pointing up the fact that the individual reflector elements are quite inexpensive to manufacture.

Referring again to FIG. 2, it may be assumed that light source 31 produces either white light or light with at least distinctive colors. If a white light source is employed, it is preferable to utilize appropriate filters to limit the system to the distinct colors employed for reflector elements 18; on the other hand, this is not essential.

Thus, and as described above, the beam that is projected toward target 17 along path 21 includes light of at least two distinctive colors and of a given initial polarization, the beam being continuously modulated at a fixed frequency and moving through a limited scanning pattern in a direction transverse to the main beam path 21.

The projected light beam, impinging upon one of the individual reflector elements 18 of reflector target 17, is reflected back through lens 42 and is deflected by beam splitter 41 to impinge upon polarization filter 44. Polarization filter 44 translates only light of a polarization distinctively different from the initial polarization of the projected beam. However, and as noted above, the individual reflector elements rotate the polarization of the reflected beam relative to the projected beam, so that the reflected signal light is passed through polarization filter 44 and through the scanning disc and fixed slit of the receiving means to impinge upon dichroic mirror 48. Assuming that the reflected light is of the color transmittable through mirror 48, the reflected beam continues through color filter 49 and condenser 52 and excites photocell 54 to produce an electrical signal. This code signal is supplied from the photocell, through filter 56, to transmitter 13.

The next individual reflector element moving into the beam path may be assumed to be of a second color, a color that is reflected by dichroic mirror 48. Accordingly, reflected light from the second reflector element is deflected by mirror 48 and passes through color filter 53 and condenser 54 to excite photosensor 55. The electrical signal produced by photocell 55 is supplied, through filter 57, to transmitter 13.

The cross-polarization operation carried out by optical system 12 in combination with the individual reflector elements 18 of target 17 is effective to eliminate reflections from the railroad cars or other objects being identified, other than those reflections from the code reflector elements themselves. Thus, when the projected light beam is reflected by a flat surface or other part of the railroad car, there is no change in polarization, and the reflected light cannot pass through polarization filter 44 in the receiving means of an optical system 12. This cross-polarization technique is highly effective in preventing spurious excitation of the photocells 52 and 55 in response to stray reflections of light initially originating with light source 31.

The coordinated scanning discs 37 and 46 make it possible to scan limited portions of each target in sequence. This synchronized scanning apparatus allows a concentrated light beam to be projected and to receive information only from the aforementioned limited areas, reducing the amount of background light from unencoded portions of target structure 17 and from other parts of the vehicle or other object being identified.

If the scanning mechanism moves the beam vertically, then the target 17 is mounted on the cars in a vertical alignment as shown in the drawings. If the scanning mechanism moves the beam horizontally, or if the car motion is used to provide relative motion between the optical unit and the target, then the target should be placed horizontally.

In most environments, the vehicles or other objects being identified are illuminated from other sources, such as sunlight or other ambient light. These relatively steady illumination sources do cause the receiving means of optical system 12 to develop spurous code signals, however, since any such light reaching the photocells 52 and 55 does not produce code signals having the characteristic frequency applied to the original light beam by modulator 36. In this manner further rejection is achieved with respect to extraneous signal sources.

The use of beam splitter 41, together with a single lens system 42, for projection and reception of the light beam insures that the transmitting and receiving axes of the beam are always collinear. This collinearity gives better depth of field, with the same resolution, than can be achieved with a separate two-lens system. Moreover, the beam splitter arrangement illustrated in FIG. 2 eliminates the necessity for collimation of separate lenses that would be presented in a dual lens system.

The use of relatively large corner reflectors for polarization rotation allows use of the system in diverse environments where the target structures are subject to coating from dirt, lint, grease, and other foreign materials. The shape of the corner reflectors and their orientation with respect to the polarization of the incident beam retains the desired relatively high reflection efficiency with the requisite change in polarization. Even if reflection efficiency is degraded, the polarization change enables the system to continue to distinguish code element reflections from other reflected or incident light. Moreover, the probability that corresponding structures will be present on the objects being identified is quite low.

Hence, while preferred embodiments of the invention have been described and illustrated, it is to be understood that they are capable of variation and modification and I, therefore, do not wish to be limited to the precise details set forth, but desire to avail myself of such changes and alterations as fall within the purview of the following claims.

I claim:
1. An automatic object-identification system for identifying objects moved along a given course adjacent a scanning station, said system comprising:
  scanning means, located at said scanning station, for developing a beam of light having a uniform initial polarization and for projecting said polarized light beam toward a predetermined point on said course;
  a series of code reflector members, each mounted on an individual object to be identified in position to reflect said light beam back toward said scanning station whenever said object is located at a given position, with said reflector member at said predetermined point, on said course;
  each of said reflector members including at least one reflector element effective to intercept and reflect said light beam with a change of about 90° in polarization from said initial polarization to a second polarization;
  and receiving means, located at said scanning station, for intercepting said reflected light beam and for developing electrical code signals in response thereto, said receiving means comprising a photosensitive detecting device, means for directing said reflected beam to impinge on said detecting device, and polarization filter means associated with said directing means for limiting light impinging upon said detecting device to light of said second polarization.

2. An automatic object-identification system for identifying objects moved along a given course adjacent a scanning station, said system comprising:
  scanning means, located at said scanning station, for developing a beam of light having a uniform initial polarization and for projecting said polarized light beam toward a predetermined point on said course;
  modulator means, incorporated in said scanning means, for continuously modulating said light beam at a given modulation frequency;
  a series of code reflector members, each mounted on an individual object to be identified in position to reflect said light beam back toward said scanning station whenever said object is located at a given position, with said reflector member at said predetermined point, on said course;
  each of said reflector members including at least one reflector element effective to intercept and reflect said light beam with a change of about 90° in polarization from said initial polarization to a second polarization;
  and receiving means, located at said scanning station, for intercepting said reflected light beam and for developing electrical code signals in response thereto, said receiving means comprising a photosensitive detecting device, means for directing said reflected beam to imping on said detecting device, and polarization filter means associated with said directing means for limiting light impinging upon said detecting device to light of said second polarization;
  said receiving means including a frequency-responsive circuit, coupled to said detecting device, for effectively rejecting code signals at frequencies other than said modulation frequency.

3. An automatic object-identification system for identifying objects moved along a given course adjacent a scanning station, said system comprising:
  scanning means, located at said scanning station, and including a light source and first beam-focusing means, for developing a beam of light having a uniform initial polarization and for projecting said polarized light beam along a predetermined path toward a predetermined point on said course;
  a series of code reflector members, each mounted on an individual object to be identified in position to reflect said light beam back along said path toward said scanning station whenever said object is located at a given position, with said reflector member at said predetermined point, on said course;
  each of said reflector members including at least one reflector element effective to intercept and reflect said light beam with a change of about 90° in polarization from said initial polarization to a second polarization;
  and receiving means, located at said scanning station, for intercepting said reflected light beam and for developing electrical code signals in response thereto, said receiving means comprising a photosensitive detecting device, second focussing means for focussing said reflected beam on said detecting device, and polarization filter means associated with said focussing means for limiting light impinging upon said detecting device to light of said second polarization;
  said first and second focussing means including a beam-splitting device, interposed in said beam path, for deflecting the reflected beam from said path toward said detecting device while permitting said beam to pass therethrough from said light source.

4. An automatic object-identification system for identifying objects moved along a given course adjacent a scanning station, said system comprising:
  scanning means, located at said scanning station, and including a light source and beam-focussing means, for developing a beam of light having a uniform initial polarization and for projecting said polarized light beam toward a predetermined point on said course, said light source producing light of two distinctively different colors;
  a series of code reflector members, each mounted on an individual object to be identified in position to reflect said light beam back toward said scanning station whenever said object is located at a given position, with said reflector member at said predetermined point, on said course;
  each of said reflector members including at least one reflector element effective to intercept and reflect said light beam with a change of about 90° in polarization from said initial polarization to a second polarization;

and receiving means, located at said scanning station, for intercepting said reflected light beam and for developing electrical code signals in response thereto, said receiving means comprising two photosensitive detecting devices, means for directing said reflected beam to impinge on each of said detecting devices, polarization filter means associated with said directing means for limiting light impinging upon said detecting devices to light of said second polarization, and color filter means for limiting the light impinging on each of said detecting devices to light of one of said distinctive colors.

5. An automatic object-identified system for identifying objects moved along a given course adjacent a scanning station, said system comprising:

scanning means, located at said scanning station, for developing a beam of light having a uniform initial polarization and for projecting said polarized light beam along a given path toward a predetermined point on said course;

beam deflection means, included in said scanning means, for continuously effectively deflecting said beam back and forth over a limited range in a direction transverse to said beam path;

a series of code reflector members, each mounted on an individual object to be identified in position to reflect said light beam back toward said scanning station whenever said object is located at a given position, with said reflector member at said predetermined point, on said course;

each of said reflector members including at least one reflector element effective to intercept and reflect said light beam with a change of about 90° in polarization from said initial polarization to a second polarization;

and receiving means, located at said scanning station, for intercepting said reflected light beam and for developing electrical code signals in response thereto, said receiving means comprising a photosensitive detecting device, means for directing said reflected beam to impinge on said detecting device, and polarization filter means associated with said directing means for limiting light impinging upon said detecting device to light of said second polarization.

6. An automatic object-identification system for identifying objects moving along a given course adjacent a scanning station, said system comprising:

scanning means, located at said scanning station, for developing a beam of light having a uniform initial polarization and for projecting said polarized light beam along a given path toward a predetermined point on said course;

a series of code reflector members, each mounted on an individual object to be identified in position to reflect said light beam back toward said scanning station as said object traverses said course, with said reflector member moving past said predetermined point on said course;

each of said reflector members including a plurality of individual corner reflector elements located at spaced code positions on said member and each effective to intercept and reflect said light beam back along said path with a change of about 90° in polarization from said initial polarization to a second polarization;

and receiving means, located at said scanning station, for intercepting said reflected light beam and for developing electrical code signals in response thereto, said receiving means comprising a photosensitive detecting device, means for directing said reflected beam to impinge on said detecting device, and polarization filter means associated with said directing means for limiting light impinging upon said detecting device to light of said second polarization.

7. An automatic car identification system for identifying railroad cars moving along a given course adjacent a scanning station, said system comprising:

scanning means, located at said scanning station, including a light source and first beam-directing means, for developing a beam of light having a uniform initial polarization and for projecting said polarized light beam along a given path toward a predetermined point on said course, said beam including light of two distinctively different colors;

modulator means, incorporated in said scanning means, for continuously modulating said light beam at a given modulation frequency;

beam deflection means, included in said scanning means, for continuously effectively deflecting said beam back and forth over a limited range in a direction transverse to said beam path;

a series of code reflector members, each mounted on an individual car to be identified in position to reflect said light beam back along said path toward said scanning station whenever said car traverses said course and moves said reflector member past said predetermined point on said course;

each of said reflector members including a plurality of corner reflector elements each effective to intercept and reflect said light beam with a change of about 90° in polarization from said initial polarization to a second polarization;

receiving means, located at said scanning station, for intercepting said reflected light beam and for developing electrical code signals in response thereto, said receiving means comprising two photosensitive detecting devices, second beam-directing means for directing said reflected beam to impinge upon each of said detecting devices, polarization filter means associated with and directing means for limiting light impinging upon said detecting devices to light of said second polarization, and color filter means for limiting the light impinging on each detecting device to light of one of said distinctive colors;

said first and second beam-directing means including a beam-splitting device, interposed in said beam path, for deflecting the reflected beam from said path toward said detecting devices while permitting said beam to pass therethrough from said light source;

and frequency-sensitive circuit means, coupled to each of said detecting devices, for effectively rejecting code signals at frequencies other than said modulation frequency.

References Cited

UNITED STATES PATENTS

| | | |
|---|---|---|
| 2,341,422 | 2/1944 | Bubb. |
| 2,998,746 | 9/1961 | Gievers. |
| 3,200,698 | 8/1965 | Froome et al. |
| 3,225,177 | 12/1965 | Stites et al. |
| 3,346,319 | 10/1967 | Billings _____ 350—72 XR |
| 3,356,438 | 12/1967 | Macek et al. _____ 350—150 |

OTHER REFERENCES

"21 Ways To Pick Data Off Moving Objects" by Robert Barber, Control Engineering, October 1963 (pp. 82–86).

MAYNARD R. WILBUR, *Primary Examiner.*

SOL SCHEINBEIN, *Assistant Examiner.*

U.S. Cl. X.R.

350—352; 250—225